(12) United States Patent
Marquant et al.

(10) Patent No.: US 8,306,119 B2
(45) Date of Patent: Nov. 6, 2012

(54) METHOD FOR HIERARCHICALLY CODING VIDEO IMAGES

(75) Inventors: Gwenaelle Marquant, La Chapelle Chaussee (FR); Edouard Francois, Bourg des Comptes (FR); Jérôme Vieron, Bedee (FR)

(73) Assignee: Thomson Licensing, Issy-les Moulineaux (FR)

( * ) Notice: Subject to any disclaimer, the term of this patent is extended or adjusted under 35 U.S.C. 154(b) by 1405 days.

(21) Appl. No.: 11/665,884

(22) PCT Filed: Oct. 11, 2005

(86) PCT No.: PCT/FR2005/050839
§ 371 (c)(1),
(2), (4) Date: Apr. 18, 2007

(87) PCT Pub. No.: WO2006/042990
PCT Pub. Date: Apr. 27, 2006

(65) Prior Publication Data
US 2008/0187045 A1    Aug. 7, 2008

(30) Foreign Application Priority Data

Oct. 20, 2004    (FR) .................................. 04 11127

(51) Int. Cl.
*H04B 1/66*    (2006.01)
(52) U.S. Cl. .................................. 375/240.16; 375/240
(58) Field of Classification Search ............. 375/240.16, 375/240
See application file for complete search history.

(56) References Cited

U.S. PATENT DOCUMENTS

| | | | |
|---|---|---|---|
| 4,903,317 A | 2/1990 | Nishihara et al. | |
| 5,742,343 A | 4/1998 | Haskell et al. | |
| 5,748,199 A * | 5/1998 | Palm | 345/473 |
| 5,956,026 A * | 9/1999 | Ratakonda | 715/723 |
| 6,181,823 B1* | 1/2001 | Takahashi | 382/232 |
| 6,526,099 B1* | 2/2003 | Christopoulos et al. | 375/240.26 |

(Continued)

FOREIGN PATENT DOCUMENTS

EP    0753970    1/1997

(Continued)

OTHER PUBLICATIONS

Search Report Dated Jan. 25, 2006.

*Primary Examiner* — Techane Gergiso
(74) *Attorney, Agent, or Firm* — Robert D. Shedd; Jeffrey M. Navon

(57) ABSTRACT

The picture and coding method comprises the following steps:
coding of the lowest resolution picture to provide coded data for a base layer of the coded data flow,
zoom of the picture to obtain a low resolution zoomed picture of dimensions of those of the picture for the common video part,
coding of to supply coded data to an upper layer of the coded data flow and using at least one of the following modes:
predictive inter layer coding using a previous low resolution zoomed picture in which a predicted block and a motion vector defining this block is determined,
predictive inter layer coding using a current low resolution zoomed picture in which a predicted block and a motion vector defining this block is determined.

6 Claims, 3 Drawing Sheets

U.S. PATENT DOCUMENTS

Figure 1:
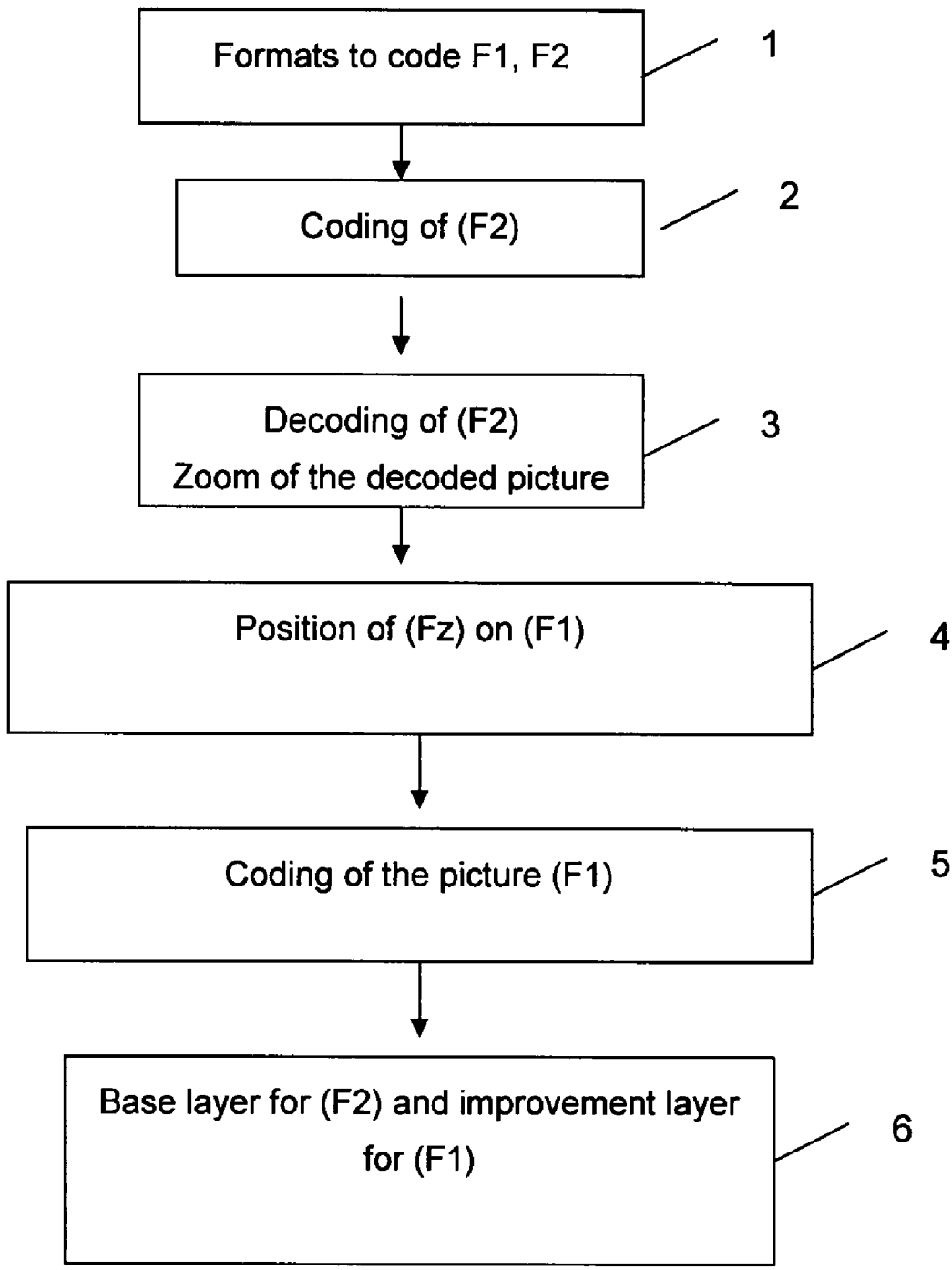

| | | | |
|---|---|---|---|
| 7,110,459 B2 * | 9/2006 | Srinivasan | 375/240.29 |
| 2001/0012444 A1 * | 8/2001 | Ito et al. | 386/111 |
| 2001/0055340 A1 * | 12/2001 | Kim et al. | 375/240.21 |
| 2002/0150158 A1 * | 10/2002 | Wu et al. | 375/240.12 |
| 2002/0191867 A1 * | 12/2002 | Le et al. | 382/300 |
| 2004/0117358 A1 * | 6/2004 | von Kaenel et al. | 707/3 |
| 2004/0150747 A1 * | 8/2004 | Sita | 348/558 |
| 2005/0207664 A1 * | 9/2005 | Ramasastry et al. | 382/240 |

FOREIGN PATENT DOCUMENTS

| | | |
|---|---|---|
| EP | 0883300 | 12/1998 |
| WO | WO 01/77871 | 10/2001 |

\* cited by examiner

METHOD FOR HIERARCHICALLY CODING VIDEO IMAGES

This application claims the benefit, under 35 U.S.C. §365 of International Application PCT/FR05/050839, filed on Oct. 11, 2005, which was published in accordance with PCT Article 21(2) on Apr. 27, 2006 in French and which claims the benefit of French patent application No. 0411127, filed on Oct. 20, 2004.

The invention relates to a method and device for hierarchical coding and decoding of video pictures of different non-proportional formats. It relates in particular to the pictures having a common video part. For example, this involves the coding of a digital television signal in SD format, acronym for Standard Definition, and in the high definition HD format.

The video coders with spatial scalability are in the known domain. The data flow generated by the video coder has a scalable hierarchy, the coded data are incorporated into the flow in a hierarchical manner, with spatial scalability. The video formats involved by these coders are those for which the dimensions of the high resolution correspond to a multiple of 2 of those of the low resolution dimensions, enabling a dyadic decomposition. Thus, a coding method compatible with a QCIF format, acronym for Quarter Common Intermediate Format, of dimensions 176×144 and with a CIF format of dimensions 352×288, or else a coding method compatible with a CIF format and a 4 CIF format of dimensions 704×576 is obtained by subsampling and filtering the high resolution picture.

Hierarchical coding enables a base layer to be obtained, relative to the low resolution format, and an upper layer that corresponds to the higher resolution format. The additional data relating to the upper layer are generally calculated according to the following method:
- coding of the low resolution picture and local decoding of this picture to obtain a reconstructed picture,
- scaling or zoom of the low resolution reconstructed picture, for example by interpolation and filtering, to obtain high resolution format picture,
- difference, pixel by pixel, of the luminance values of the source picture and the reconstructed picture or of a prediction picture based on this reconstructed picture to obtain residues constituting the data of the upper layer.

Thus the coding of the high resolution picture uses the low resolution picture scaled as prediction picture.

The coding is only effective in cases where the pictures can be overlaid. The cost of coding the high resolution picture is not optimised if the picture resolutions or formats are not proportional. If the high resolution format image is not related to the low resolution format by a dyadic transformation, part of the picture in high resolution format corresponds to a video zone outside of the zone coded by the low resolution picture and therefore does not take this picture as prediction picture. Hence, the coding of the entire high resolution picture, in particular if it possesses large video zones not common to the low resolution picture, can be a high cost. Moreover, the standard coding modes used do not enable the coding cost of the high resolution picture to be optimised.

The invention aims to overcome the disadvantages described above. One of the purposes of the invention is a hierarchical coding method of different non-proportional formats to give a flow of coded data, a first picture (F1) in format F1 and a second picture (F2) in format F2 of a lower resolution to the first format F1, the video content of the images (F1) and (F2) having at least one common part, characterized in that it implements the following steps:
- coding of the picture (F2) to provide coded data for a base layer of the coded data flow,
- zoom of the picture (F2) to obtain a low resolution zoomed picture (Fz) of dimensions those of the picture (F1) for the common video part,
- coding of the high resolution picture (F1) to supply coded data to an upper layer of the coded data flow and using at least one of the following modes:
  - predictive inter layer coding using a previous low resolution zoomed picture in which a predicted block and a motion vector defining this block is determined,
  - predictive inter layer coding using a current low resolution zoomed picture in which a predicted block and a motion vector defining this block is determined, According to a particular implementation, the method is characterized in that the high resolution is realised according to the following steps:
- coding of the picture zone to the common video content to supply a picture of residues relating to the prediction picture (Fz),
- decoding this zone to provide a reconstructed common zone,
- coding the non-common part using at least the inter-spatial coding mode consisting in using the reconstructed common mode as prediction picture to determine a predicted block.

According to a particular implementation, the picture (F2) used for the zoom is a reconstructed picture obtained by the local decoding of the coded picture (F2).

According to a particular implementation, the inter-layer predictive coding comprises a sub-mode in which the predicted macroblock is the macroblock being located at the same place as the macroblock to code.

According to a particular implementation, the zoom consists in an oversampling and filtering of the picture.

According to a particular implementation, the video images are subband pictures obtained by temporal decomposition of the wavelet type or subband coding of the source pictures The invention also relates to a procedure for decoding a flow of digital data structured into at least one base layer comprising data relative to a low resolution image and an upper layer comprising data relating to a high resolution picture, the low resolution picture corresponding to at least a video part of the high resolution picture, characterized in that it comprises the following steps:
- extraction of data from the base layer relating to the low resolution picture and decoding the low resolution picture,
- zoom of the decoded picture to provide a zoomed picture (Fz),
- extraction and decoding of data from the upper layer and implementing at least one of the following decoding modes:
  - inter-layer predictive mode using a block in the previous low resolution picture decoded and zoomed (Fz) designated by a motion vector,
  - inter-layer predictive mode using a block in the current low resolution picture decoded and zoomed, designated by a motion vector.

According to a particular implementation, the upper layer being constituted of coded data corresponding to a picture of residues relating to a prediction picture (Fz) for the common part to the low resolution picture and coded data corresponding to an edge picture relating to the non-common part, during the decoding of the high resolution picture, the common part of the low resolution picture is first decoded from the residues picture and the zoomed picture and the edge picture is then decoded by implementing at least one inter-spatial mode using the blocks of the said common decoded part determined by motion vectors.

Owing to these new modes for coding the high resolution picture, the compression rate is improved. A better picture quality is obtained for these high resolution pictures for the same coding cost of these pictures.

Figure 2:
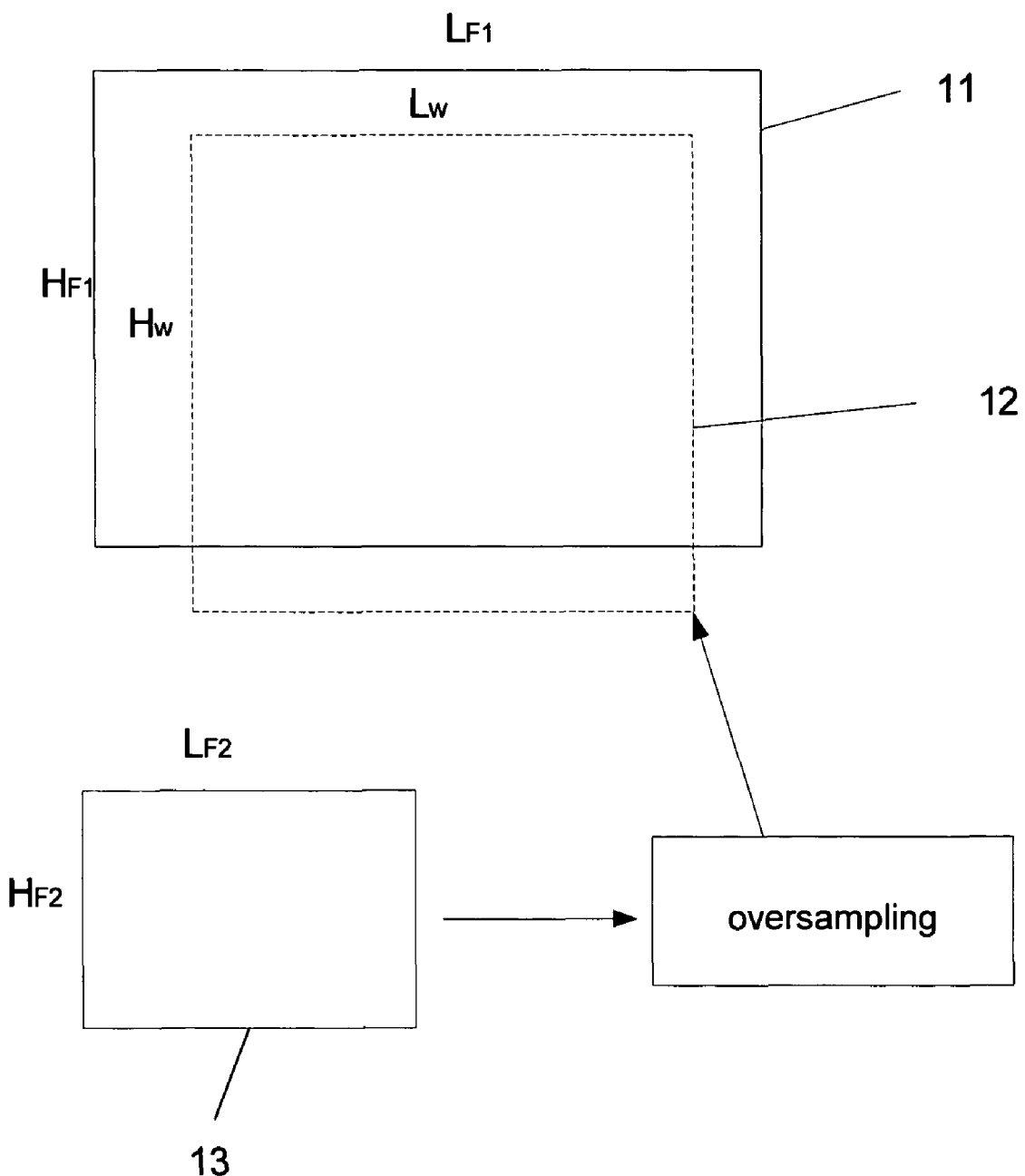
Figure 3:
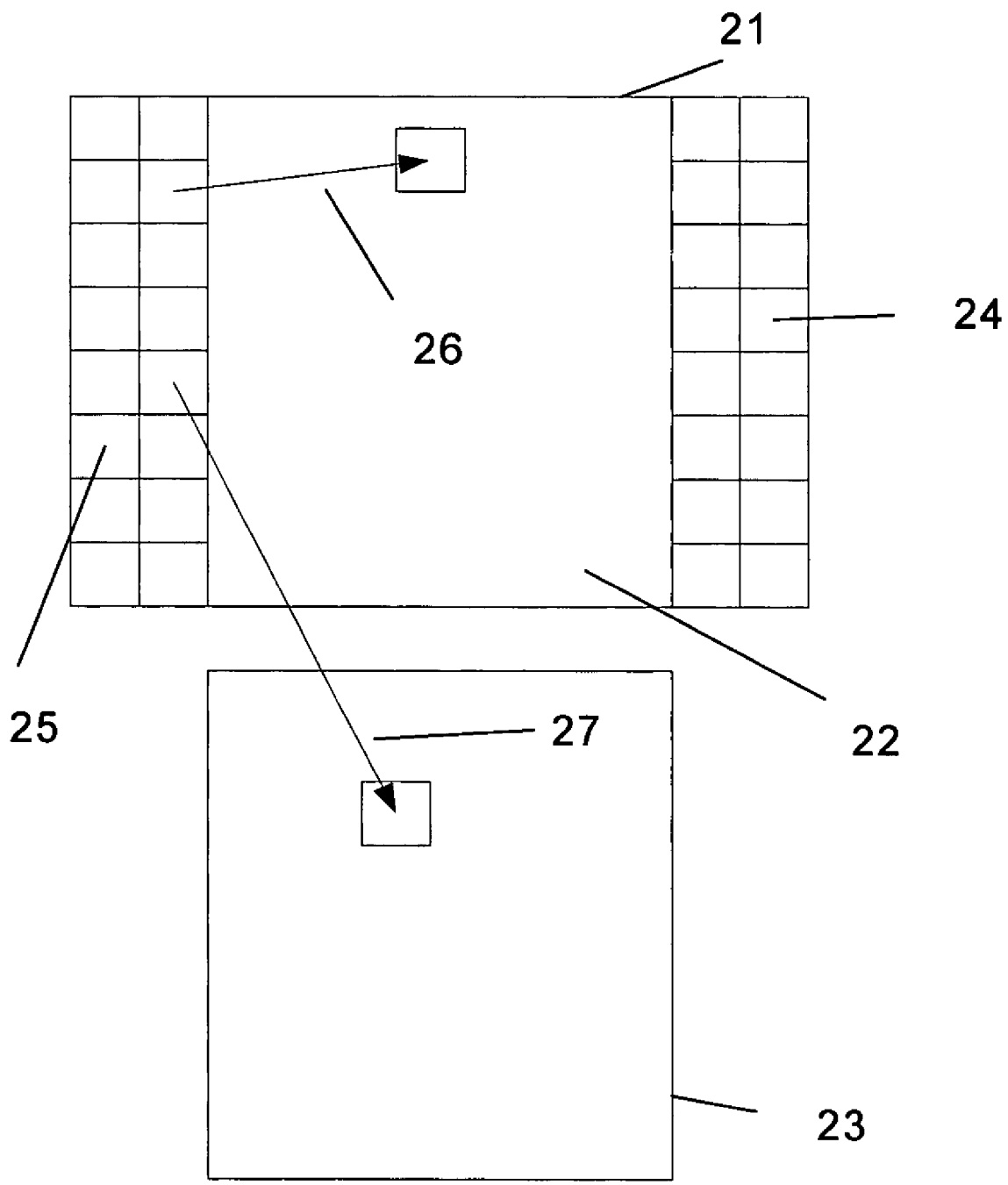

Other specific features and advantages will emerge clearly from the following description, the description provided as a non-restrictive example and referring to the annexed drawings wherein:

FIG. 1, a coding method flow chart,

FIG. 2, a representation of the formats to code,

FIG. 3, an illustration of these coding modes.

The coding method of the data is a hierarchical coding method, namely that the flow of coded data is structured in a hierarchical manner, the data relating to the lowest resolution format being integrated into a base layer or lower layer, the additional data relating to the format of the higher resolution picture being integrated into an upper layer. At the level of the data flow, it is easy to select only the data relating to a standard or a format, by selecting only the layers corresponding to the required level of resolution. This involves spatial scalability, compatible with any temporal scalability required by the standard relating to the resolution format.

The invention concerns the coding of video contents of different non-proportional formats into width and/or height and having a common video part. One of the formats has a lower resolution than the other format. It is either of lower definition with the number of pixels by line or the number of lines defining for example the lower common video part, or for the same definition, of lower size.

FIG. 1 shows a flow chart of the coding method according to the invention.

A first step 1 takes into account the different formats to code. The flow of data coded obtained at the output of the coder can supply decoders compatible with one of these formats, the selection of the format, according to the display device, the decoder or parameters such as the transmission fate being carried out by filtering the data at the level of this coded data flow, before or at the level of the decoder.

In the example described, a first high resolution format F1 and a second low resolution format F2 are used. Each of these formats is defined by its width $L_{F1}$, $L_{F2}$ or number of pixels on the line and its height $H_{F1}$, $H_{F2}$ or number of lines.

It is considered that the video sources supplying the coder are in the F1 and F2 formats. They correspond, for one part only, to the same video content. For one part only means that the video content of these two sources is assumed to be different, namely that one cannot move from one format to the other by mere scaling or, in another manner, that the formats are not proportional.

Geometric parameters are also sent to the coder enabling the common video part to the two formats to be defined.

The creation of these source pictures and the calculation of the geometric parameters can be carried out in the following manner:

From the formats chosen, a first and second video window are dimensioned and positioned in an original picture to define the video contents of this picture to code in each of the formats. By hypothesis, these two windows overlap at least partially. They define the video contents to code in the format F1 and format F2. The dimensions of these parameters and second windows are selected scaled respectively to the formats F1 and F2.

The upper and lower resolution source pictures sent to the coder can have the same definition as the original picture or different definitions to that of the original picture or between them, according to whether or not they undergo sampling and filtering operations. The term "definition" here means the number of pixels per line or number of lines for a given video content. The high resolution picture, called (F1), is selected as reference picture to define the geometric parameters. This involves, for example, the position of the picture (F2) of format F2 in the picture (F1) and the definition relationship that corresponds to the zoom to apply to the picture (F2) to match the video content of (F2) with the video content of (F1) for the common part.

Step 2 codes the video picture into F2 format.

Step 3 decodes this coded picture to supply a local decoded picture or reconstructed picture. In a simplified version, the local decoded picture can consist of the original picture before coding, namely the source picture (F2). This picture is then scaled or zoomed by a ratio corresponding to the geometric parameter relating to the definition ratio, to obtain a zoomed picture (F2), called (Fz).

The following step 4 positions the picture (Fz) on the high resolution picture (F1) according to the geometric parameter relating to the position, so as to match the video contents.

The following step 5 codes the high resolution picture. This coding takes into account the different coding modes that are the subject of the invention and described further on.

Step 6 inserts the coding data relating to the picture (F2) into a base layer of the data flow and the coding data specific to the high resolution image (F1) in an upper layer.

FIG. 2 represents a first video content in the high resolution coding format F1, reference 11 and a window of dimensions $L_w$ and $H_w$, reference 12. This window is defined and positioned in the high resolution picture from geometric parameters. The video content of this window is calculated from the video content in the low resolution coding format F2 of dimensions $L_{F2}$ and $H_{F2}$, reference 13. The picture in format F2 is coded than decoded to supply a local decoded picture that is then oversampled to provide a scaled or zoomed picture (Fz) at the dimensions of the window 12.

FIG. 3 represents different modes of coding the high resolution picture (F1), according to the invention. The oversampled picture (Fz) is referenced 23, the window positioned in the high resolution picture is referenced as 22, the picture (F1) is referenced 21. In this example, the window is positioned in the middle of the picture (F1) generating right 24 and left 25 strips as zones of the picture (F1) not covered or not common.

The invention proposes to add new coding modes to the modes already known, for the coding of the high resolution picture.

Among the known mode, a first coding mode called intra predictive coding uses one of the previously coded macroblocks. The current macroblock of the high definition picture is coded by taking into account one of the neighbouring macroblocks of the current macroblock, a macroblock of the current picture to the left or above the current macroblock. This selection is made according to the rate of correlation with the current macroblock to code.

Another coding mode also known, called inter predictive coding, uses a previously coded high resolution picture. The current macroblock of the high resolution picture is coded from a predictive macroblock that is a picture block selected from a search window of a previous high resolution picture. This selection is made according to the rate of correlation with the current macroblock to code, the picture block selected is defined by a motion vector.

The new coding modes proposed for the high resolution picture are described below:

A coding mode called inter layer predictive coding consists in using the low resolution picture correspondingly scaled, at the temporal level, to the high resolution picture to code. This coding mode uses coding information belonging to the base layer for the coding of information belonging to the upper layer. The predictive block is searched for in the picture (FZ), namely in the reconstructed picture in format F2 and scaled or zoomed. The selection of the block in the picture (Fz) depends on the rate of correlation with the current macroblock. An item of position information is calculated to define the picture block selected and sent in the data flow in the form of a motion vector.

Another mode which is a variant on the inter layer predictive coding mode uses a scaled low resolution previous picture. The predictive block is searched for in a previous picture (Fz), namely a scaled previous reconstructed picture (F2). The selection of the block in the picture (Fz) depends on the rate of correlation with the current macroblock. The block is defined from a motion vector.

A variant of the previous modes, "default" mode, consists in using the macroblock of the picture (Fz) that is found in the same position as the current macroblock to code. In this case, which only concerns the coding of the macroblocks of the high resolution picture common to the low resolution picture, no motion vector is sent. This mode prevents coding a zero motion vector and thus offers a low coding cost.

A coding mode known as inter spatial mode is applied to a particular structuring of the coding of the high resolution picture that is made in two successive phases. The coding of the high resolution picture is not realised sequentially, macroblock by macroblock, according to a scan of the television type but is carried out in a first phase processing the zone of the high resolution picture common to Fz then in a second phase processing the video part not common to Fz. The geometric parameters can define the part of the high resolution picture common, at the level of the video content, to the low resolution picture. This portion of picture is coded, during the first phase, by using the reconstructed picture (F2) or the zoomed source picture (F2) as prediction picture. A residues picture or high frequency picture is thus obtained. The second phase consists in coding the non-common part or edge picture. The invention proposes, for this coding operation, the use of a particular coding mode, called inter spatial mode, among the different coding modes. This coding mode consists of coding a macroblock of the zone not common to the low resolution picture by using the common zone of the picture as prediction picture, by specifying the position of the predictive block in the common zone using a motion vector. The prediction picture can be reconstructed from the zoomed picture and from the residues picture or else can be deduced from the high definition source picture by selecting only the common part from this picture.

At stage 4 of the coding method, the picture (Fz) is positioned on the picture F1. The method thus codes this common picture part for example by calculating the residue taking into account the picture (Fz) as prediction picture. The residues picture is then combined with the zoomed reconstructed picture (F2) to supply a recombined picture that can be used as prediction for the coding of the part not common to the high definition picture.

By referring to FIG. 3, the inter-spatial coding mode uses, as prediction picture for the coding of the edges, the common central zone 22 reconstructed from the zoomed low resolution picture 23 and from the residues picture corresponding to this common zone. The picture block in this central zone 22, obtained by correlation calculation, is defined by a motion vector referenced 26 in FIG. 3.

The inter-layer coding mode uses the zoomed picture 23 as the prediction picture. The picture block in the zoomed picture 23, obtained by correlation calculation, is defined by the motion vector referenced 27 in FIG. 3.

The invention also concerns the decoding of source pictures coded according to the method described above.

The decoding thus consists in extracting the data of the base layer relating to the low resolution picture and in decoding this low resolution picture into a zoom of the decoded picture to give a zoomed picture (Fz), in extracting and decoding data of the upper layer by implementing at least one of the following decoding modes.

This is the inter-layer predictive mode using a block in the low resolution previous picture decoded and zoomed (Fz) and prediction block, this is also the inter-layer predictive mode using a block in the current decoded and zoomed low resolution picture as prediction block.

When the upper layer is constituted by a residues picture relating to a prediction picture (Fz) for the common part to the low resolution picture and by an edge picture relating to the non-common part, the decoding of the high resolution picture is carried out in two phases. First, the common part of the high definition picture is calculated from the residues picture and by using the zoomed low resolution picture as prediction picture, this is the first phase. Next, the non-common part or edge picture is decoded by implementing at least one interspatial decoding mode that consists of recovering a picture block from the common part of the high definition picture, a block defined by a motion vector and using it as prediction block for the decoding of a macroblock of this edge picture coded according to the inter-spatial mode.

The coding procedure implemented for the coding of the base layer and the upper layer can be of a hybrid type, using the spatial correlation with the discrete cosine transform or the spatial wavelet transform and the temporal with the inter-picture coding or else of the subband type using the subband coding or wavelet coding.

The coding method is described for video source pictures. It is also possible, without leaving the scope of the invention, to code pre-processed source pictures, for example subband pictures. The method can also apply to each of the subband pictures, low frequencies and high frequencies obtained by spatial or spatio-temporal filtering. The same subband decomposition being applied to the low and high resolution pictures, the equivalent subbands of the low and the high resolution can be coded according to the method described in the invention. For example, the low frequency subband of the low resolution picture and the high resolution picture can be coded according to this method. This is also true for all the other spatial subbands.

The invention claimed is:

1. A hierarchical coding method to give a flow of coded data, a first picture in format F1 and a second picture in format F2 of a lower resolution to the first format F1, video content of the first and second pictures having at least one common part, the method comprising the steps of:
coding of the second picture to provide coded data for a base layer of the flow of coded data,
zooming of the second picture to obtain a low resolution zoomed picture of dimensions of those of the first picture for the common part, wherein the first picture and the second picture have different non-proportional formats,
coding of a picture zone of the common part to supply a picture of residues relating to the prediction picture, decoding the coded picture zone to provide a reconstructed common zone, coding of the first, high resolution picture image blocks of a non common part, to supply coded data to an upper layer of the coded data flow by using at least one of the following modes:

predictive inter layer coding using a previous low resolution zoomed picture in which a predicted block and a motion vector defining the predicted block is determined, predictive inter layer coding using a current low resolution zoomed picture in which a predicted block and a motion vector defining the predicted block is determined, wherein the non-common part is coded using at least an inter-spatial coding mode consisting in using the reconstructed common zone as prediction picture to determine a predicted block.

2. The method according to claim 1, wherein the second picture used for the zoom is a reconstructed picture obtained by local decoding of the coded picture.

3. The method according to claim 1, wherein the inter-layer predictive coding comprises a sub-mode in which a predicted macroblock is a macroblock being located at the same place as a macroblock to code.

4. The method according to claim 1, wherein the zooming consists in an oversampling and filtering of the second picture.

5. The method according to claim 1, wherein the first and second pictures are subband pictures obtained by temporal decomposition of a wavelet type coding or subband coding of source pictures.

6. A method for decoding a flow of digital data structured into at least one base layer comprising data relative to a low resolution picture and an upper layer comprising data relating to a high resolution picture, the low resolution picture and the high resolution picture having at least one common part, comprising the following steps:

extracting data from the base layer relating to the low resolution picture and decoding the low resolution picture, zooming the decoded low resolution picture to provide a zoomed picture, extracting and decoding of data from the upper layer, the upper layer being constituted of coded data corresponding to a residues picture for the common part and coded data corresponding to an edge picture relating to the non common part, wherein the coded data corresponding to the residues picture for the common part relate to a prediction picture, and wherein the data corresponding to an edge picture relating to the non common part are image blocks of the non common part, implementing at least one of the following decoding modes:

inter-layer predictive mode using a block in the previous decoded and zoomed low resolution picture designated by a motion vector, inter-layer predictive mode using a block in the current decoded and zoomed low resolution picture, designated by a motion vector, wherein, during the decoding of data from the upper layer, the common part of the low resolution picture is first decoded from the residues picture and the zoomed picture, and wherein the edge picture is then decoded by implementing at least one inter-spatial mode using blocks of the decoded common part determined by motion vectors.

* * * * *